(12) United States Patent
Binion et al.

(10) Patent No.: US 11,948,202 B2
(45) Date of Patent: *Apr. 2, 2024

(54) SYSTEMS AND METHODS TO QUANTIFY AND DIFFERENTIATE INDIVIDUAL INSURANCE RISK ACTUAL DRIVING BEHAVIOR AND DRIVING ENVIRONMENT

(71) Applicant: STATE FARM MUTUAL AUTOMOBILE INSURANCE COMPANY, Bloomington, IL (US)

(72) Inventors: Todd Binion, Bloomington, IL (US); Andrea Lee Rhoades, Kenney, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,959

(22) Filed: Nov. 23, 2021

(65) Prior Publication Data

US 2022/0084131 A1 Mar. 17, 2022

Related U.S. Application Data

(63) Continuation of application No. 16/153,964, filed on Oct. 8, 2018, now Pat. No. 11,210,740, which is a continuation of application No. 14/507,092, filed on Oct. 6, 2014, now Pat. No. 10,115,164.

(60) Provisional application No. 61/887,201, filed on Oct. 4, 2013.

(51) Int. Cl.
*G06Q 40/08* (2012.01)
*B60K 28/06* (2006.01)
*B62D 15/02* (2006.01)
*G08B 21/00* (2006.01)
*G08B 21/06* (2006.01)

(52) U.S. Cl.
CPC ............. *G06Q 40/08* (2013.01); *G08B 21/06* (2013.01); *B60K 28/06* (2013.01); *B62D 15/02* (2013.01); *G08B 21/00* (2013.01)

(58) Field of Classification Search
CPC ........ G06Q 40/08; G08B 21/06; G08B 21/00; B60K 28/06; B62D 15/02
USPC .......................................................... 705/4
See application file for complete search history.

(56) References Cited

U.S. PATENT DOCUMENTS

| | | |
|---|---|---|
| 3,947,815 A | 3/1976 | Muncheryan |
| 3,999,177 A | 12/1976 | Greene |
| 4,272,764 A | 6/1981 | Herr et al. |
| 5,270,708 A | 12/1993 | Kamishima |
| 5,353,013 A | 10/1994 | Estrada |

(Continued)

*Primary Examiner* — Bennett M Sigmond
*Assistant Examiner* — Michael J Warden
(74) *Attorney, Agent, or Firm* — MARSHALL, GERSTEIN & BORUN LLP (57) ABSTRACT

The present disclosure generally relates to systems and methods for generating data representative of an individual's insurance risk based on actual driving behaviors and driving environment. The systems and methods may include collecting data from personal electronic device sensors, vehicle sensors, driver inputs, environment sensors and interactions of the vehicle, the driver and the environment. The systems and methods may further include analyzing the data to generate data representative of an individual insurance risk. The systems and methods may further include presenting the data representative of the individual insurance risk to an individual.

20 Claims, 8 Drawing Sheets

(56) References Cited

U.S. PATENT DOCUMENTS

| | | |
|---|---|---|
| 5,499,182 A | 3/1996 | Ousborne |
| 5,522,092 A | 6/1996 | Streb et al. |
| 5,797,134 A | 8/1998 | McMillan et al. |
| 5,907,293 A | 5/1999 | Tognazzini |
| 5,916,181 A | 6/1999 | Socci et al. |
| 6,057,768 A | 5/2000 | Barnoach |
| 6,184,791 B1 | 2/2001 | Baugh |
| 6,868,386 B1 | 3/2005 | Henderson et al. |
| 8,096,946 B2 | 1/2012 | Burton |
| 8,471,909 B2 | 6/2013 | Ishikawa |
| 8,854,199 B2 | 10/2014 | Cook |
| 9,311,271 B2 | 4/2016 | Wright |
| 9,384,645 B1 | 7/2016 | Allen et al. |
| 9,440,646 B2 | 9/2016 | Fung et al. |
| 9,633,487 B2 | 4/2017 | Wright |
| 9,972,184 B2 * | 5/2018 | Freeck .................. B60R 16/037 |
| 10,115,164 B1 * | 10/2018 | Binion .................. B60W 50/14 |
| 10,192,369 B2 | 1/2019 | Wright |
| 10,198,879 B2 | 2/2019 | Wright |
| 2001/0026215 A1 | 10/2001 | Nakaho et al. |
| 2002/0183657 A1 | 12/2002 | Socci et al. |
| 2004/0150514 A1 | 8/2004 | Newman et al. |
| 2004/0153362 A1 | 8/2004 | Bauer et al. |
| 2004/0209594 A1 | 10/2004 | Naboulsi |
| 2005/0131597 A1 | 6/2005 | Raz et al. |
| 2005/0137757 A1 | 6/2005 | Phelan et al. |
| 2005/0248462 A1 | 11/2005 | Cece et al. |
| 2006/0122749 A1 * | 6/2006 | Phelan ..................... G07C 5/08 701/33.4 |
| 2006/0187305 A1 | 8/2006 | Trivedi et al. |
| 2007/0129878 A1 | 6/2007 | Pepper |
| 2007/0147660 A1 | 6/2007 | Durucan et al. |
| 2007/0200689 A1 * | 8/2007 | Kawazoe ............... B60Q 1/247 340/435 |
| 2008/0068186 A1 | 3/2008 | Bonefas et al. |
| 2008/0068187 A1 | 3/2008 | Bonefas et al. |
| 2008/0080741 A1 | 4/2008 | Yokoo et al. |
| 2008/0169914 A1 * | 7/2008 | Albertson ............. G08B 21/06 340/425.5 |
| 2008/0174451 A1 | 7/2008 | Harrington et al. |
| 2008/0201039 A1 | 8/2008 | Matsuoka et al. |
| 2008/0231461 A1 | 9/2008 | Sanchez et al. |
| 2008/0252466 A1 | 10/2008 | Yopp et al. |
| 2009/0024419 A1 | 1/2009 | McClellan et al. |
| 2009/0261979 A1 * | 10/2009 | Breed .................. B60N 2/2863 340/576 |
| 2009/0273687 A1 | 11/2009 | Tsukizawa et al. |
| 2009/0299576 A1 * | 12/2009 | Baumann ............ B60R 21/0134 701/45 |
| 2010/0030582 A1 | 2/2010 | Rippel et al. |
| 2010/0030586 A1 | 2/2010 | Taylor et al. |
| 2010/0060441 A1 | 3/2010 | Iwamoto |
| 2010/0063685 A1 * | 3/2010 | Bullinger ............. B60R 21/013 701/45 |
| 2010/0094514 A1 * | 4/2010 | Ueda ....................... B60N 2/16 701/49 |
| 2010/0131300 A1 | 5/2010 | Collopy et al. |
| 2010/0131305 A1 | 5/2010 | Collopy et al. |
| 2010/0209890 A1 | 8/2010 | Huang et al. |
| 2010/0220892 A1 | 9/2010 | Kawakubo |
| 2010/0222957 A1 * | 9/2010 | Ohta ....................... B60K 35/00 701/31.4 |
| 2010/0253495 A1 | 10/2010 | Asano et al. |
| 2011/0021234 A1 * | 1/2011 | Tibbitts .................. H04W 8/22 455/517 |
| 2011/0106370 A1 | 5/2011 | Duddle et al. |
| 2011/0213628 A1 | 9/2011 | Peak et al. |
| 2011/0258044 A1 | 10/2011 | Kargupta |
| 2012/0046857 A1 | 2/2012 | Mori et al. |
| 2012/0072244 A1 | 3/2012 | Collins et al. |
| 2012/0083959 A1 * | 4/2012 | Dolgov ................. B60W 30/08 701/23 |
| 2012/0105221 A1 | 5/2012 | Lin et al. |
| 2012/0123806 A1 | 5/2012 | Schumann, Jr. et al. |
| 2012/0169503 A1 | 7/2012 | Wu et al. |
| 2012/0212353 A1 * | 8/2012 | Fung ....................... G08G 1/167 701/1 |
| 2012/0242819 A1 | 9/2012 | Schamp |
| 2012/0268262 A1 | 10/2012 | Popovic |
| 2012/0300061 A1 | 11/2012 | Osman et al. |
| 2013/0030657 A1 | 1/2013 | Chatterjee et al. |
| 2013/0084847 A1 * | 4/2013 | Tibbitts ............. H04M 1/72454 455/419 |
| 2013/0085787 A1 | 4/2013 | Gore et al. |
| 2013/0093579 A1 | 4/2013 | Arnon |
| 2013/0093603 A1 | 4/2013 | Tschirhart et al. |
| 2013/0135109 A1 | 5/2013 | Sharon |
| 2013/0145360 A1 * | 6/2013 | Ricci ................... G06F 3/04847 717/174 |
| 2013/0162791 A1 | 6/2013 | Chen et al. |
| 2013/0217331 A1 * | 8/2013 | Manente ................. H04W 4/80 455/41.2 |
| 2013/0302758 A1 | 11/2013 | Wright |
| 2014/0009294 A1 | 1/2014 | Martinez |
| 2014/0113619 A1 * | 4/2014 | Tibbitts ................. H04W 48/04 455/419 |
| 2014/0128146 A1 * | 5/2014 | Story, Jr. ................. A63F 13/00 463/36 |
| 2014/0142805 A1 * | 5/2014 | Frye ....................... B60K 37/06 701/36 |
| 2015/0183441 A1 | 7/2015 | Aoki |
| 2015/0193664 A1 | 7/2015 | Marti et al. |
| 2015/0194035 A1 | 7/2015 | Akiva et al. |
| 2016/0005315 A1 | 1/2016 | Cudak et al. |
| 2016/0207455 A1 | 7/2016 | Kim |
| 2016/0346695 A1 | 12/2016 | Hoory et al. |
| 2022/0028009 A1 * | 1/2022 | Chan ..................... G06Q 40/08 |

\* cited by examiner

SYSTEMS AND METHODS TO QUANTIFY AND DIFFERENTIATE INDIVIDUAL INSURANCE RISK ACTUAL DRIVING BEHAVIOR AND DRIVING ENVIRONMENT

CROSS REFERENCE TO RELATED APPLICATION

The present application is a continuation of U.S. patent application Ser. No. 16/153,964, entitled SYSTEMS AND METHODS TO QUANTIFY AND DIFFERENTIATE INDIVIDUAL INSURANCE RISK BASED ON ACTUAL DRIVING BEHAVIOR AND DRIVING ENVIRONMENT, filed Oct. 8, 2018; which is a continuation of U.S. patent application Ser. No. 14/507,092, entitled SYSTEMS AND METHODS TO QUANTIFY AND DIFFERENTIATE INDIVIDUAL INSURANCE RISK BASED ON ACTUAL DRIVING BEHAVIOR AND DRIVING ENVIRONMENT, filed Oct. 6, 2014; the disclosures of each of which are incorporated herein in their entirety by reference.

TECHNICAL FIELD

The present disclosure generally relates to systems and methods to quantify and differentiate individual insurance risk. In particular, the present disclosure relates to systems and methods to quantify and differentiate individual insurance risk based on actual driving behavior and driving environment.

BACKGROUND

Insurance risk is generally not quantified or differentiated for an individual's risk based on actual, real-time, driving behavior or a real-time driving environment.

Generating insurance risk related data based on a real-time driving behavior and/or a real-time driving environment is desirable. Generating a warning or an advisory to notify the vehicle driver of her driving behavior is desirable. Furthermore, tracking the driving behavior of vehicle drivers and associated environment is desirable to perform insurance risk assessment.

SUMMARY

A computer implemented method for generating data representative of an individual's insurance risk based on driving information representative of actual operation of a vehicle may include receiving, at a processor of a computing device, in response to the processor executing a personal electronic device module, personal electronic device sensor data, wherein the personal electronic device sensor data is representative of the individual's interaction with a personal electronic device. The method may also include receiving, at a processor of a computing device, in response to the processor executing a vehicle sensor module, vehicle sensor data, wherein the vehicle sensor data is representative of actual operation of a vehicle. The method may further include generating, using a processor of a computing device, in response to the processor executing an individual insurance risk module, individual insurance risk data based on the personal electronic device sensor data and the vehicle sensor data, wherein the individual insurance risk data is representative of an individual's insurance risk.

In another embodiment, computer system for generating data representative of an individual's insurance risk based on driving information representative of actual operation of a vehicle may include a personal electronic device module, stored on a memory of a computing device, that, when executed by a processor of the computing device, causes the processor to receive personal electronic device sensor data, wherein the personal electronic device sensor data is representative of the individual's interaction with a personal electronic device. The computer system may also include a vehicle sensor module, stored on a memory of a computing device, that, when executed by a processor of the computing device, causes the processor to receive vehicle sensor data, wherein the vehicle sensor data is representative of actual operation of a vehicle. The computer system may further include an individual insurance risk module, stored on a memory of a computing device, that, when executed by a processor of the computing device, causes the processor to generate individual insurance risk data based on the personal electronic device sensor data and the vehicle sensor data, wherein the individual insurance risk data is representative of an individual's insurance risk.

In a further embodiment, tangible, computer-readable medium storing instructions that, when executed by a processor of a computer system, cause the processor to generate data representative of an individual's insurance risk based on driving information representative of actual operation of a vehicle may include a personal electronic device module that, when executed by a processor of the computing device, causes the processor to receive personal electronic device sensor data, wherein the personal electronic device sensor data is representative of the individual's interaction with a personal electronic device. The computer-readable medium may also include a vehicle sensor module that, when executed by a processor of the computing device, causes the processor to receive vehicle sensor data, wherein the vehicle sensor data is representative of actual operation of a vehicle. The computer-readable medium may further include an individual insurance risk module that, when executed by a processor of the computing device, causes the processor to generate individual insurance risk data based on the personal electronic device sensor data and the vehicle sensor data, wherein the individual insurance risk data is representative of an individual's insurance risk.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

The systems and methods of the present disclosure may quantify and/or differentiate an individual's insurance risk based on actual driving behaviors and/or driving environment via, for example, a personal electronic device to enable insurance business processes and services. These processes and services may be used to enhance current insurance models and/or may be applied to new insurance models, such as usage based insurance, on-demand auto insurance, and/or client-based insurance models. Use cases for the present systems and methods may be broken into three main categories: collection of driving data, transmission of driving data and presentation of data back to a driver. The systems and methods of the present disclosure may enable an insurance provider to create new insurance models based on individual behavior characteristics of insured individuals, in addition to vehicle and vehicle usage characteristics. The scope and granularity of the data collected via the systems and methods of the present disclosure may enable insurance providers to offer pricing down to the trip level for insured drivers. Drivers may use the information provided by systems and methods of the present disclosure to select from transportation options based on insurance costs, safety, timing, and convenience.

Collection of driving data may include, but is not limited to, data sourced from sensors within a personal electronic device (e.g., internal accelerometer, GPS, gyroscope, compass, navigation systems and other sensors); data sourced from the vehicle (e.g., OBDII port, any internal or external computers, accelerometers, sensors, VIN, build sheets, radars, cameras, video, collision avoidance technologies, gross vehicle weight, weight distribution, rental or owned, active and passive safety features, safety ratings, and other vehicle data); data sourced from the driver (e.g., driver physiology indicators and sensors, driver control, driver behavior, driver distraction or attention, driver cognitive load, driver eye movement/condition, mental state of driver, driver reaction time, driver's vision across multiple environments, drivers medications, driver sensory limitations and expertise, and other driver data); data sourced from the environment (e.g., location, time of day, temperature, road surface conditions, noise levels inside vehicle cabin, traffic density, time of day, traffic density, dangerous intersections, curves and roads, Vehicle-to-Vehicle and Vehicle-to-Infrastructure information, electronic toll booths and other environmental data); and data sourced from the interactions of the vehicle (e.g., driver and driving environment: following and closing distance, driver control, driver response to safety warning systems, driver overriding of safety systems, crash and emergency notification systems, injury estimation systems, and other interactive response data).

Transmission of collected driving data may include, but is not limited to, collect raw data and send via a client device (e.g., a personal electronic device, such as a mobile telephone, a lap-top computer, a personal data assistant, a tablet computing device, etc.) to an insurance company or third party computing device for analysis and auto insurance risk assessment; collect raw data and use algorithms to summarize and assess auto insurance risk and then send a risk assessment to a remote computing device via a client device (e.g., a personal electronic device, such as a mobile telephone, a lap-top computer, a personal data assistant, a tablet computing device, etc.); collect raw data and use algorithms to summarize and assess auto insurance risk and provide feedback to insured drivers on insurance cost, risk and ways to reduce insurance cost and risk via a client device (e.g., a personal electronic device, such as a mobile telephone, a lap-top computer, a personal data assistant, a tablet computing device, etc.); and presentation of data back to a driver such as feedback, results, costs and other information via a client device (e.g., a personal electronic device, such as a mobile telephone, a lap-top computer, a personal data assistant, a tablet computing device, etc.), web page or link.

Presentation of analyzed driving data may include, but is not limited to, providing feedback to drivers to quantify and help them improve their driving behavior, quantifying and helping drivers reduce their driving risk, and provide other information that would be helpful to reduce the risk of driving; providing services for insured drivers to manage their own risk and premium costs, assess insurance costs, pay insurance premiums, update insurance policies and coverage's in real-time, add new risk to insure and add new drivers to insure; providing services for insured drivers such as safest trip routing, trip planning, emergency crash notification, emergency roadside assistance, social networking opportunities, and other concierge services; and providing rating information to drivers based on the interpretation of data collected.

Figure 1A:
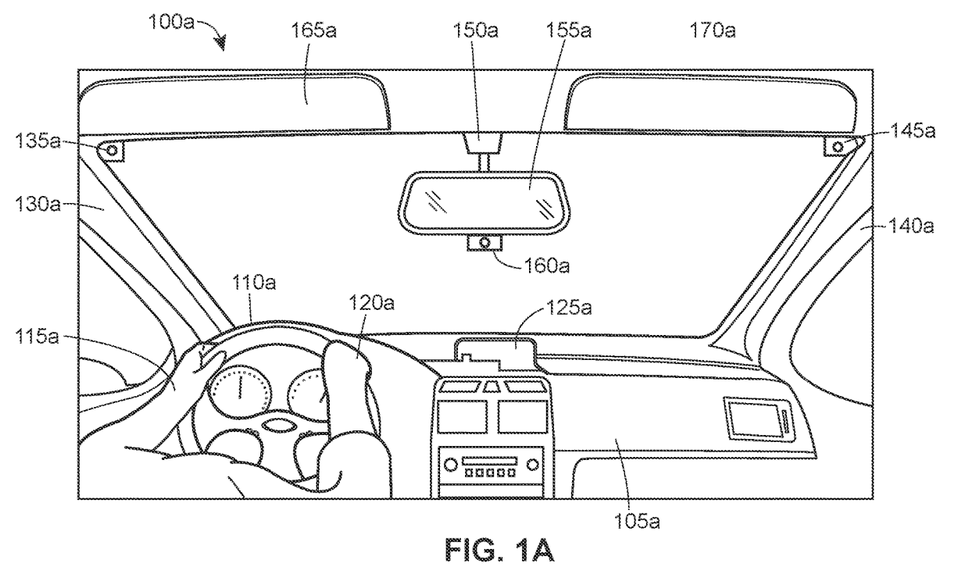
FIGS. 1A-1C depict various views of the interior of an example vehicle that illustrate locations of vehicle operator monitoring devices within and around the vehicle.
Figure 1B:
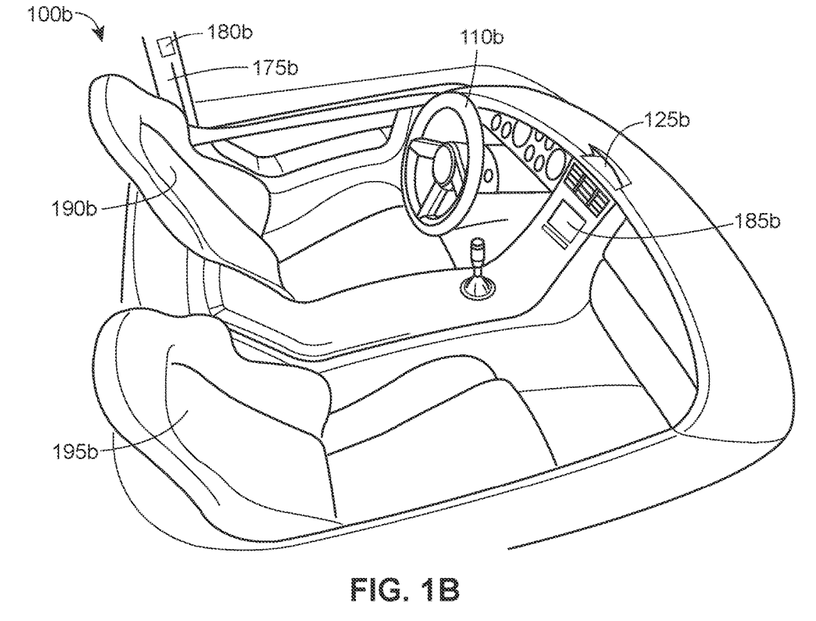
Figure 1C:
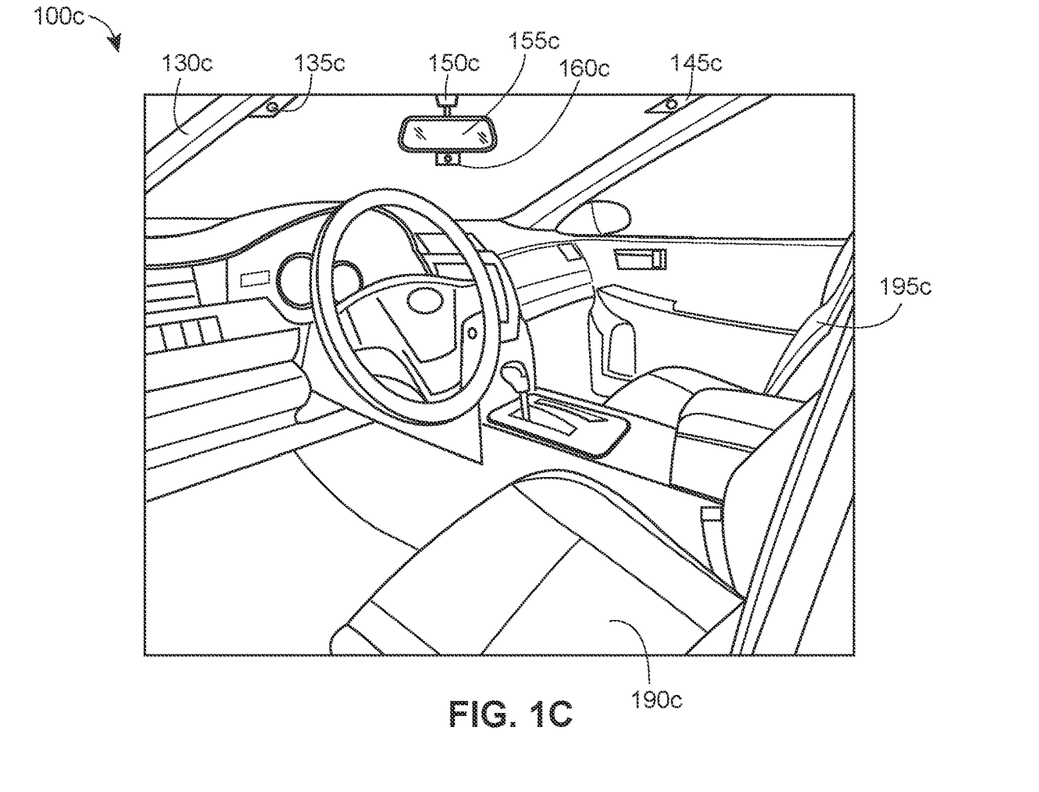

Turning to FIGS. 1A-1C, vehicle interior monitoring systems 100a, 100b, 100c are illustrated. As depicted in FIG. 1A, the vehicle interior monitoring system 100a may include a center-dash position sensor 125a located in a center area of the dash, a driver-side A-pillar position sensor 135a located in a driver side A-pillar 130a, a passenger-side A-pillar position sensor 145a located in a passenger-side A-pillar 140a and a rearview mirror position sensor 160a located on a bottom-side of the rearview mirror 155a. The vehicle interior monitoring system 100a may further, or alternatively, include position sensors in a driver-side visor 165a, a passenger-side visor 170a, a rearview mirror mounting bracket 150a and, or the steering wheel 110a. As described in detail herein, a position of a left-hand 115a of a vehicle driver and, or a position of a right-hand 120a of the vehicle driver, relative to a vehicle steering wheel 110a may be determined based on data acquired from any one of the position sensors 125a, 135a, 145a, 160a. Any one of the position sensors 125a, 135a, 145a, 160a may be an image sensor, an infrared sensor, an ultrasonic sensor, a microphone or any other suitable position sensor.

With reference to FIG. 1B, the vehicle monitoring system 100b may include a driver-side B-pillar position sensor 180b located in a driver-side B-pillar 175b and a center-dash position sensor 125b located in a center area of the dash. While not shown in FIG. 1B, the vehicle monitoring system 100b may include a passenger-side B-pillar position sensor and, or any other position sensors as described in conjunction with FIG. 1A. The vehicle monitoring system 100b may further include a display device 185b. The display device 185b may be located in a center-console area. As illustrated in FIG. 1B, data acquired from the position sensors 125b, 180b may be used to determine a position of a driver-side seat 190b, a passenger-side seat 195b, a steering wheel 110b and, or at least a portion of a vehicle driver (not shown in FIG. 1B).

Turning to FIG. 1C, the vehicle interior monitoring system 100c may include a driver-side A-pillar position sensor 135c located in a driver side A-pillar 130c, a passenger-side A-pillar position sensor 145c located in a passenger-side A-pillar 140c and a rearview mirror position sensor 160c located on a bottom-side of the rearview mirror 155c. The vehicle interior monitoring system 100c may further, or alternatively, include position sensors in a rearview mirror mounting bracket 150c and, or the steering wheel 110c. While not shown in FIG. 1C, the vehicle monitoring system 100c may include any other position sensors as described in conjunction with FIGS. 1A and 1B. As illustrated in FIG. 1C, data acquired from the position sensors 135c, 145c may be used to determine a position of a driver-side seat 190c, a passenger-side seat 195c, a steering wheel 110c and, or at least a portion of a vehicle driver (not shown in FIG. 1C).

Figure 2A:
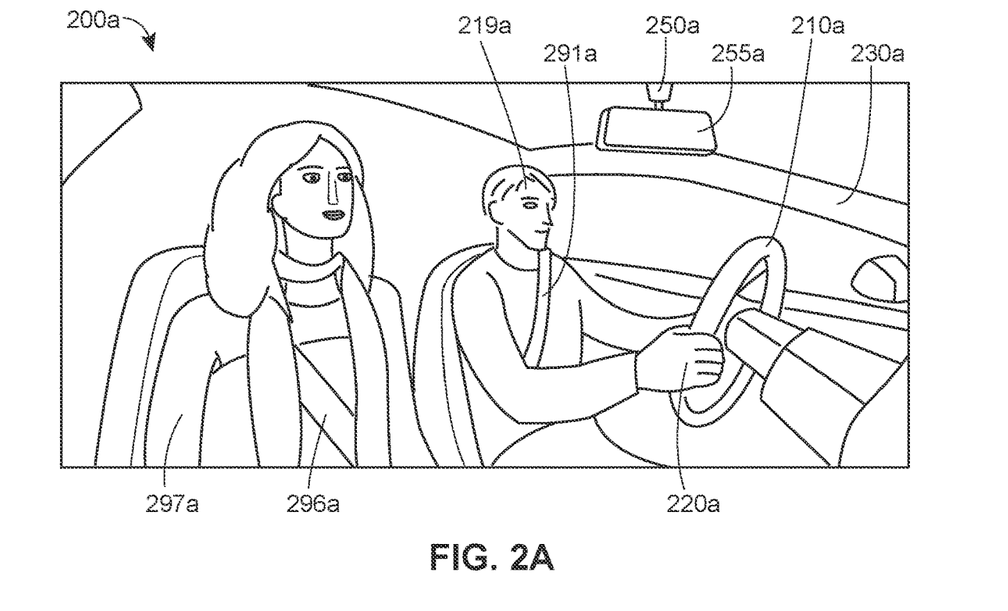
FIGS. 2A-2C illustrate various example images constructed from data retrieved from the vehicle monitoring devices of FIGS. 1A-1C.
Figure 2B:
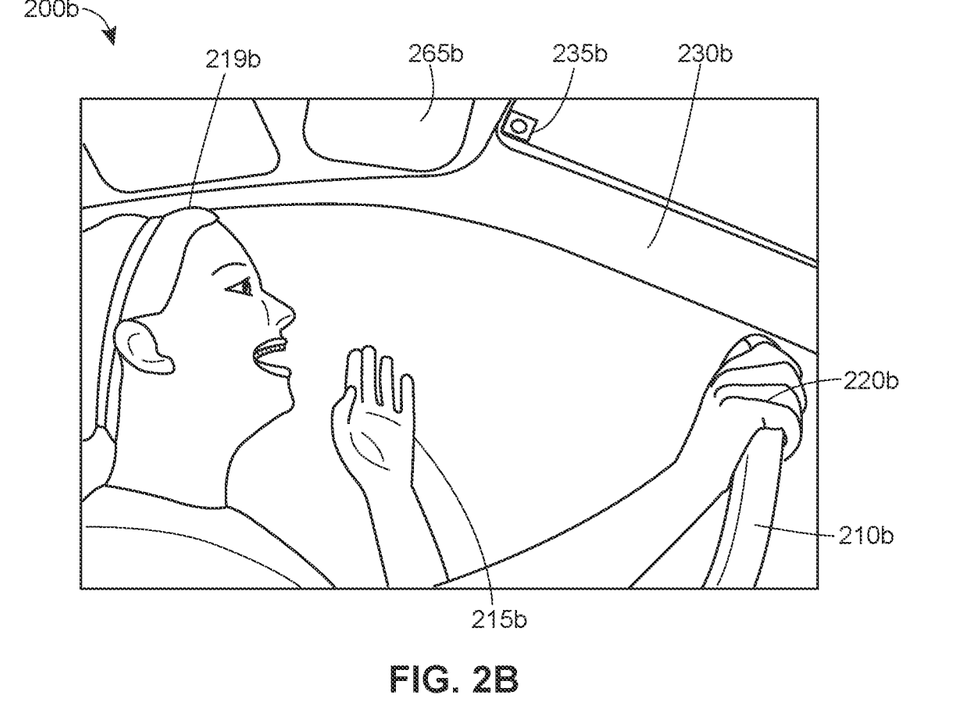
Figure 2C:
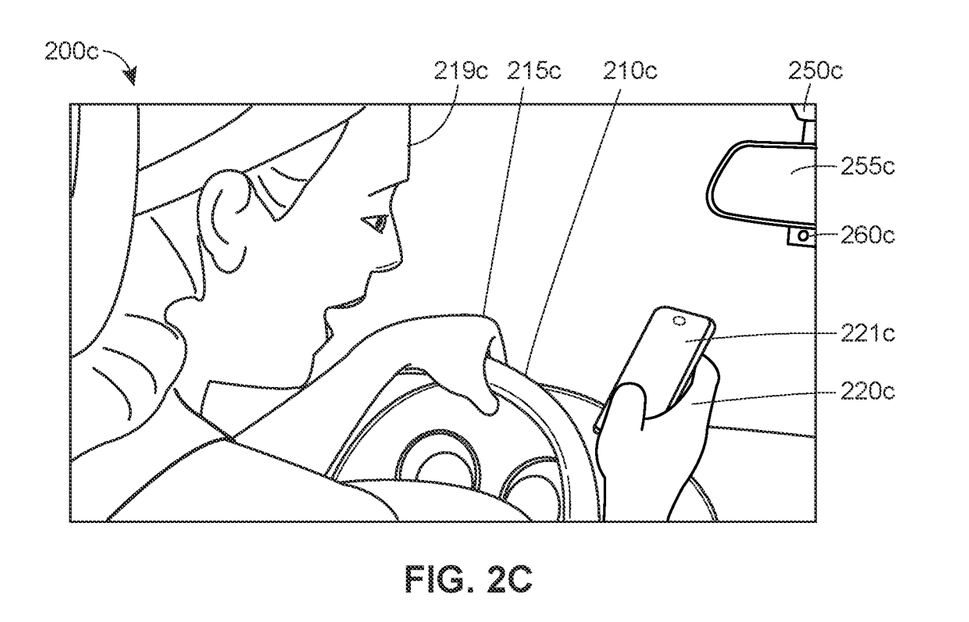

With reference to FIGS. 2A-2C, vehicle interiors 200a, 200b, 200c are depicted. As described in detail herein, data acquired from the position sensors 125a, 135a, 145a, 160a, 180b of FIGS. 1A and 1B (or any other suitably located position sensors) may be used to determine a position of at least a portion of a passenger 297a within the vehicle interior 200a. The data acquired from the position sensors 125a, 135a, 145a, 160a, 180b (or any other suitably located position sensors) may be used to determine whether, or not the passenger 297a is wearing a seatbelt 296a. As further illustrated in FIG. 2A, data acquired from the position sensors 125a, 135a, 145a, 160a, 180b of FIGS. 1A and 1B (or any other suitably located position sensors) may be used to determine a position and, or orientation of a vehicle driver's head 219a and, or right-hand 220a on a steering wheel 210a. For example, the data acquired from the position sensors 125a, 135a, 145a, 160a, 180b may be used to determine whether the vehicle driver's head 219a is oriented toward a rearview mirror 255a, oriented toward the driver-side A-pillar 230a or oriented toward the front windshield. The data acquired from the position sensors 125a, 135a, 145a, 160a, 180b may be used to determine whether the driver is wearing a seatbelt 291a. In any event, the vehicle interior 200a may include a microphone 250a located proximate the rearview mirror 255a. As described in detail herein, data acquired from the microphone 250a may be used to determine a source of sound within the vehicle interior 200a and, or a volume of the sound.

FIG. 2B depicts a vehicle interior 200b including a driver-side A-pillar position sensor 235b located on a driver-side A-pillar 230b. As described in detail herein, data acquired from the position sensor 235b (along with any other suitably located position sensors) may be used to determine a position and, or orientation of a driver's head 219b, the driver's left hand 215b and, or right hand 220b relative to the steering wheel 210b. For example, data acquired from the position sensor 235b (along with any other suitably located position sensors) may be used to determine a gesture that the driver is performing with her left hand 215b.

Turning to FIG. 2C, a vehicle interior 200b depicts a position sensor 260c located on a bottom side of a rearview mirror 255c opposite a rearview mirror mount 250c. As described in detail herein, data acquired from the sensor 260c (along with any other suitably located position sensors) may be used to determine a position and, or orientation of a driver's head 219c, the driver's left hand 215c and, or right hand 220c relative to the steering wheel 210c. For example, data acquired from the position sensor 260c (along with any other suitably located position sensors) may be used to determine that the driver's head 219c is oriented toward a cellular telephone 221c in her right hand 220c. As also described in detail herein, a determination may be made that the driver is inattentive to the road based on the driver's head 219c being oriented toward the cellular telephone 221c. As described herein, a client device (e.g., cellular telephone 221c) may include a host of sensors (e.g., internal accelerometer, GPS, gyroscope, compass, navigation systems and other sensors) from which data may be acquired for use in generating individualized insurance risk related data.

Figure 3:
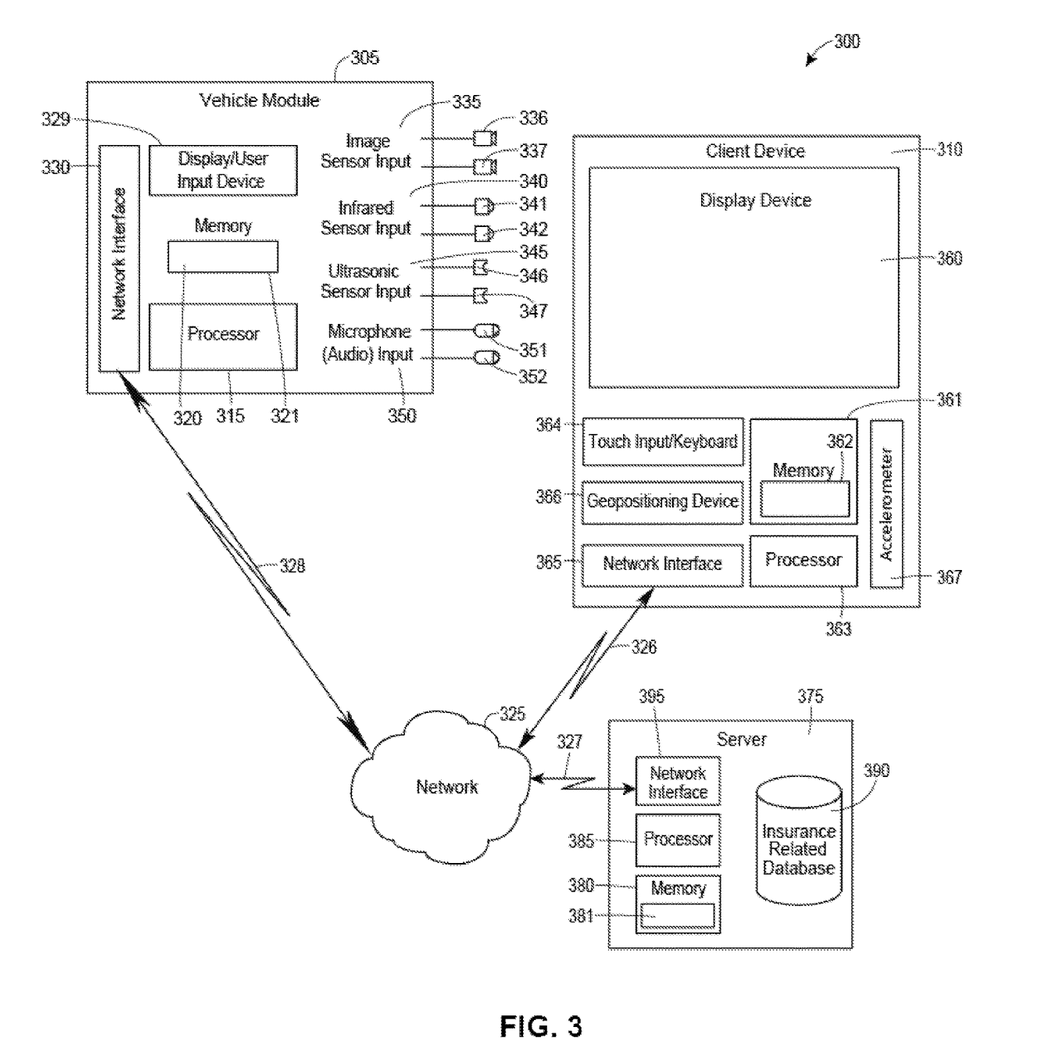
FIG. 3 illustrates a block diagram of a computer network, a computer server, a client device and an on-board vehicle computer on which an exemplary vehicle operator data acquisition system and method may operate in accordance with the described embodiments.

With reference to FIG. 3, a high-level block diagram of an insurance risk related data collection system 300 is illustrated that may implement communications between a vehicle module 305, a client device 310 and a remote computing device 375 (e.g., a remote server) to provide vehicle operated related data and, or vehicle environment data to an insurance related database 390. For example, the insurance risk related data collection system 300 may acquire data from position sensors (e.g., position sensors 125a, 135a, 145a, 160a, 180b of FIGS. 1A and 1B) and generate vehicle operator related data as illustrated in FIGS. 2A-2C. The insurance risk related data collection system 300 may also acquire data from a microphone (e.g., microphone 250a of FIG. 2A) and determine a source of sound and volume of sound within a vehicle interior. The insurance risk related data collection system 300 may further acquire data from client device 310 sensors (e.g., internal accelerometer, GPS, gyroscope, compass, navigation systems and other sensors) from which data may be acquired for use in generating individualized insurance risk related data.

For clarity, only one vehicle module 305 and only one client device 310 are depicted in FIG. 3. While FIG. 3 depicts only one vehicle module 305 and only one client device 310, it should be understood that any number of vehicle modules 305 and client devices 310 may be supported and that each client device 310 may be any appropriate computing device, such as a mobile telephone, a personal data assistant, a tablet or a lap-top computer. The client device 310 may include a memory 361 and a processor 363 for storing and executing, respectively, a module 362. The module 362, stored in the memory 361 as a set of computer-readable instructions, may be related to an insurance risk related data collecting application that, when executed on a processor 363, causes insurance risk related data to be retrieved from sensors 366, 367 within the client device 310 and from a vehicle module 305 and to be stored in the memory 361. As described in detail herein, the module 362 may facilitate interaction between the client device 310, the vehicle module 305 and the remote computing device 375. The processor 363, further executing the module 362, may facilitate communications between the computing device 3375 and the client device 310 via a network interface 365, a client device network connection 326 and the network 325.

The client device 310 may include a display device 360 which may be any type of electronic display device such as a liquid crystal display (LCD), a light emitting diode (LED) display, a plasma display, a cathode ray tube (CRT) display, or any other type of known or suitable electronic display. The display device 360 may exhibit a display which depicts a user interface for configuring the client device 310 to communicate with the vehicle module 305 via the network interface 365, the wireless link 3326 and the vehicle module 305 network interface 330. The client device 310 may include a user input device 364, such as a touch input/keyboard/pointing device (e.g., a mouse) that provides a mechanism for a user of the client device 310 to launch a client device insurance application and, for example, to select what vehicle operation related data to collect. The user input device 364 may be configured as an integral part of a display device 360, such as a touch screen display device. The network interface 365 may be configured to facilitate communications between the client device 310 and the remote computing device 375 via any wireless communication network 325, including for example a wireless LAN, MAN or WAN, WiFi, the Internet, or any combination thereof. Moreover, the client device 310 may be communicatively connected to the remote computing device 375 via any suitable communication system, such as via any publicly available or privately owned communication network, including those that use wireless communication structures, such as wireless communication networks, including for example, wireless LANs and WANs, satellite and cellular telephone communication systems, etc. The client device 310 may cause insurance risk related data to be transmitted to and stored in a remote server 375 memory 380 and/or a remote insurance related database 390.

The vehicle module 305 may include a memory 320 and a processor 315 for storing and executing, respectively, a module 321. The module 321, stored in the memory 320 as a set of computer-readable instructions, may be related to a vehicle interior and occupant position data collecting application that, when executed on the processor 315, causes vehicle position data to be stored in the memory 320. Execution of the module 321 may also cause the process 315 to generate at least one 3D model of at least a portion of a driver within the vehicle interior. Execution of the module 321 may further cause the processor 315 to associate the position data with a time and, or date. Execution of the module 321 may further cause the processor 315 to communicate with the processor 385 of the remote computing device 375 via the network interface 330, the vehicle module communications network connection 328 and the wireless communication network 325.

The vehicle module 305 may further include an image sensor input 335 communicatively connected to a first image sensor 336 and a second image sensor 337. While two image sensors 336, 337 are depicted in FIG. 3, any number of image sensors may be included within a vehicle interior monitoring system and may be located within a vehicle interior as depicted in FIGS. 1A-1C. The image sensors 336, 337 may also provide data representative of an environment surrounding an associated vehicle. The vehicle module 305 may also include an infrared sensor input 340 communicatively connected to a first infrared sensor 341 and a second infrared sensor 342. While two infrared sensors 341, 342 are depicted in FIG. 3, any number of infrared sensors may be included within a vehicle interior monitoring system and may be located within a vehicle interior as depicted in FIGS. 1A-1C. The infrared sensors 341, 342 may also provide data representative of an environment surrounding an associated vehicle. The vehicle module 305 may further include an ultrasonic sensor input 345 communicatively connected to a first ultrasonic sensor 346 and a second ultrasonic sensor 347. While two ultrasonic sensors 346, 347 are depicted in FIG. 3, any number of ultrasonic sensors may be included within a vehicle interior monitoring system and may be located within a vehicle interior as depicted in FIGS. 1A-1C. The ultrasonic sensors 346, 347 may also provide data representative of an environment surrounding an associated vehicle. The vehicle module 305 may also include a microphone input 350 communicatively connected to a first microphone 351 and a second microphone 352. While two microphones 351, 352 are depicted in FIG. 3, any number of microphones may be included within a vehicle interior monitoring system and may be located within a vehicle interior as depicted in FIGS. 1A-1C. The microphones 351, 352 may also provide data representative of an environment surrounding an associated vehicle. The vehicle module 305 may further include a display/user input device 325.

As one example, a first image sensor 336 may be located in a driver-side A-pillar (e.g., location of position sensor 135a of FIG. 1A), a second image sensor 337 may be located in a passenger-side A-pillar (e.g., location of position sensor 145a of FIG. 1A), a first infrared sensor 341 may be located in a driver-side B-pillar (e.g., location of position sensor 180b of FIG. 1B), a second infrared sensor 342 may be located in a passenger-side B-pillar (not shown in the FIGS.), first and second ultrasonic sensors 346, 347 may be located in a center portion of a vehicle dash (e.g., location of position sensor 125a of FIG. 1A) and first and second microphones 351, 352 may be located on a bottom portion of a vehicle interior rearview mirror (e.g., location of position sensor 160a of FIG. 1A). The processor 315 may acquire position data from any one of, or all of, these sensors 336, 337, 341, 342, 346, 347, 351, 352 and generate at least one 3D model (e.g., a 3D model of at least a portion of a vehicle driver) based on the position data. The processor 315 may transmit data representative of at least one 3D model associated with the vehicle operator or the environment surrounding the vehicle operator and/or vehicle to the remote computing device 375. Alternatively, the processor 315 may transmit the position data to the remote computing device 375 and the processor 385 may generate at least one 3D model based on the position data. In either event, the processor 315 or the processor 355 retrieve data representative of a 3D model of a vehicle operator and compare the data representative of the 3D model of at least a portion of the vehicle driver with data representative of at least a portion of the 3D model vehicle operator. The processor 315 and, or the processor 385 may generate a vehicle driver warning based on the comparison of the data representative of the 3D model of at least a portion of the vehicle driver with data representative of at least a portion of the 3D model vehicle operator to warn the vehicle operator that his position is indicative of inattentiveness. Alternatively, the processor 315 and/or the processor 385 may generate an advisory based on the comparison of the data representative of the 3D model of at least a portion of the vehicle driver with data representative of at least a portion of the 3D model of a vehicle operator to advise the vehicle operator how to correct her position to improve attentiveness.

The network interface 330 may be configured to facilitate communications between the vehicle module 305 and the remote computing device 375 and/or the client device 310 via any hardwired or wireless communication network 325, including for example a wireless LAN, MAN or WAN, WiFi, the Internet, or any combination thereof. Moreover, the vehicle module 305 may be communicatively connected to the remote computing device 375 via any suitable communication system, such as via any publicly available or privately owned communication network, including those that use wireless communication structures, such as wireless communication networks, including for example, wireless LANs and WANs, satellite and cellular telephone communication systems, etc. The vehicle module 305 may cause insurance risk related data to be stored in a client device 310 memory 361, a remote computing device 375 memory 380 and/or a remote insurance related database 390.

The remote computing device 375 may include a memory 380 and a processor 385 for storing and executing, respectively, a module 381. The module 381, stored in the memory 380 as a set of computer-readable instructions, facilitates applications related to collecting insurance risk related data and generating data representative of an individualized insurance risk. The module 381 may also facilitate communications between the computing device 375 and the vehicle module 305 via a network interface 395, a remote computing device network connection 327 and the network 325 and other functions and instructions.

The computing device 375 may be communicatively coupled to an insurance related database 390. While the insurance related database 390 is shown in FIG. 3 as being communicatively coupled to the remote computing device 375, it should be understood that the insurance related database 390 may be located within separate remote servers (or any other suitable computing devices) communicatively coupled to the remote computing device 375. Optionally, portions of insurance related database 390 may be associated with memory modules that are separate from one another, such as a memory 320 of the vehicle module 305 and/or the memory 361 of the client device 310.

Figure 4:
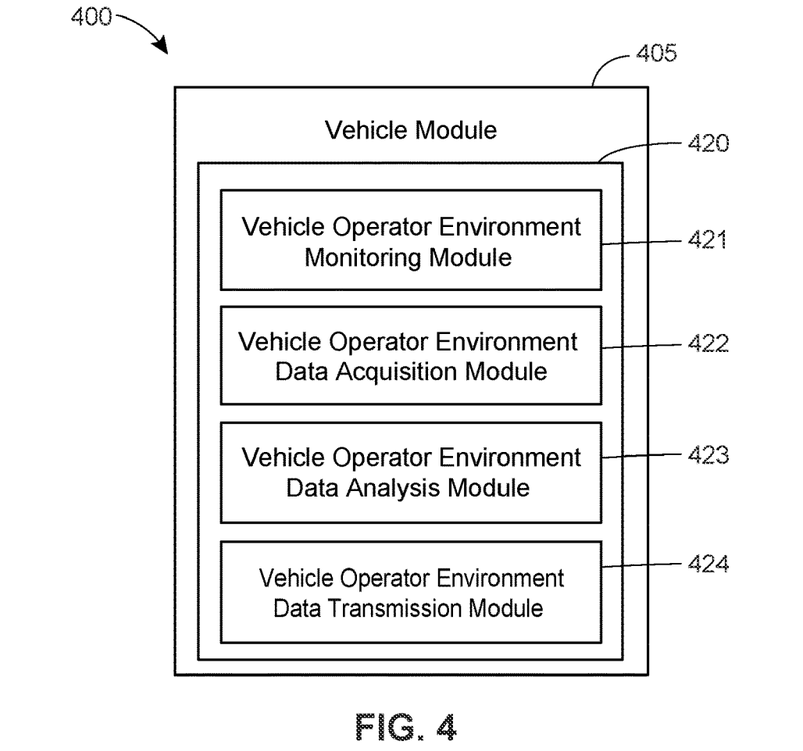
FIG. 4 illustrates a block diagram of an exemplary vehicle module for use in acquiring, analyzing and transmitting vehicle operator related and environment data.
Figure 5:
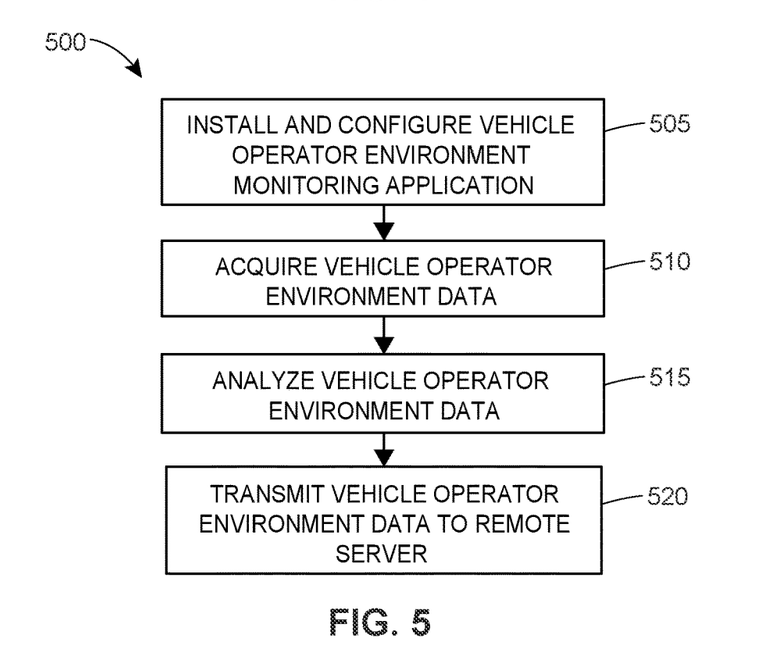
FIG. 5 depicts a flow diagram of an example method of acquiring, analyzing and transmitting vehicle operator related and environment data.

Turning to FIGS. 4 and 5, a vehicle module 405 of an insurance risk related data collection system 400 is depicted along with a method of establishing an insurance risk related data file on the vehicle module 405 and, or transmitting insurance risk related data to a client device 310 and/or a remote server 375. The vehicle module 405 may be similar to the vehicle module with insurance application 305 of FIG. 3. The method 500 may be implemented by executing the modules 421-424 on a processor (e.g., processor 315). In any event, the vehicle module 405 may include a vehicle operator environment monitoring module 421, a vehicle operator environment data acquisition module 422, a vehicle operator environment data analysis module 423 and a vehicle operator environment data transmission module stored in a memory 420. The processor 315 may execute the vehicle operator environment monitoring module 421 to, for example, cause the processor 315 to receive data representative of a vehicle operator related data and/or vehicle environment data (block 505). The data representative of the vehicle operator related data and/or vehicle environment may have been generated, for example, in conjunction with a vehicle safety study and may reflect an ideal position and orientation of a vehicle driver's head and hands. For example, the data representative of a vehicle operator related data and/or vehicle environment may indicate that the vehicle operator's left hand is grasping a steering wheel near a minus forty-five degree angle relative to a top of the steering wheel and the vehicle operator's right hand is grasping the steering wheel near a positive forty-five degree angle relative to the top of the steering wheel. Additionally, the data representative of a vehicle operator related data and/or vehicle environment may indicate that the vehicle operator's head is oriented such that the operator is looking forward out the front windshield of an associated vehicle. Alternatively, the data representative of the vehicle operator related data and/or vehicle environment may reflect a sequence of positions of the model vehicle operator. For example, the vehicle operator related data and/or vehicle environment may reflect that the operator is periodically scanning the rearview mirrors while most often looking forward out the front windshield of an associated vehicle.

The processor 315 may execute the vehicle operator environment data acquisition module 422 to acquire position data from various position sensors (e.g., image sensors 336, 337, infrared sensors 341, 342, ultrasonic sensors 346, 347) and, or sound data from various microphones (e.g., microphones 351, 352), data sourced from sensors within a personal electronic device (e.g., internal accelerometer, GPS, gyroscope, compass, navigation systems and other sensors); data sourced from the vehicle (e.g., OBDII port, any internal or external computers, accelerometers, sensors, VIN, build sheets, radars, cameras, video, collision avoidance technologies, gross vehicle weight, weight distribution, rental or owned, active and passive safety features, safety ratings, and other vehicle data); data sourced from the driver (e.g., driver physiology indicators and sensors, driver control, driver behavior, driver distraction or attention, driver cognitive load, driver eye movement/condition, mental state of driver, driver reaction time, driver's vision across multiple environments, drivers medications, driver sensory limitations and expertise, and other driver data); data sourced from the environment (e.g., location, time of day, temperature, road surface conditions, noise levels inside vehicle cabin, traffic density, time of day, traffic density, dangerous intersections, curves and roads, Vehicle-to-Vehicle and Vehicle-to-Infrastructure information, electronic toll booths and other environmental data); and data sourced from the interactions of the vehicle (e.g., driver and driving environment: following and closing distance, driver control, driver response to safety warning systems, driver overriding of safety systems, crash and emergency notification systems, injury estimation systems, and other interactive response data) (block 510). For example, the processor 315 may acquire data from the position sensors that is indicative of a position and, or orientation of a vehicle driver's head and, or at least one of the vehicle driver's hands. The processor 315 may also acquire data from at least one microphone that is indicative of a source of sound within and/or around a vehicle interior and, or the volume of sound within and/or around the vehicle interior.

The processor 315 may execute the vehicle operator environment data analysis module 423 to determine a position of at least a portion of a vehicle driver (block 515) based on the acquired position data. For example, the processor 315 may generate vehicle operator data and/or vehicle operator environment data based on the data acquired from at least one position sensor 336, 337, 341, 342, 346, 347. The processor 315 may also generate a warning to the vehicle driver based on a comparison of a 3D model of at least a portion of the vehicle driver and at least a portion of a 3D model vehicle operator. Furthermore, the processor 315 may determine a source and, or volume of sound within the vehicle interior based on data received from at least one microphone 351, 352. The processor 315 may also generate a warning to the vehicle driver based on the data representative of the sound within the vehicle interior.

The processor 315 may execute the vehicle operator environment data transmission module 424 to transmit vehicle interior position and, or vehicle interior sound data to a remote computing device (block 520). For example, the processor 315 may transmit position data and, or sound data to a remote computing device 310. Alternatively, the processor 315 may transmit data to the remote computing device 310 that is representative of a 3D model of at least a portion of a vehicle driver.

Figure 6:
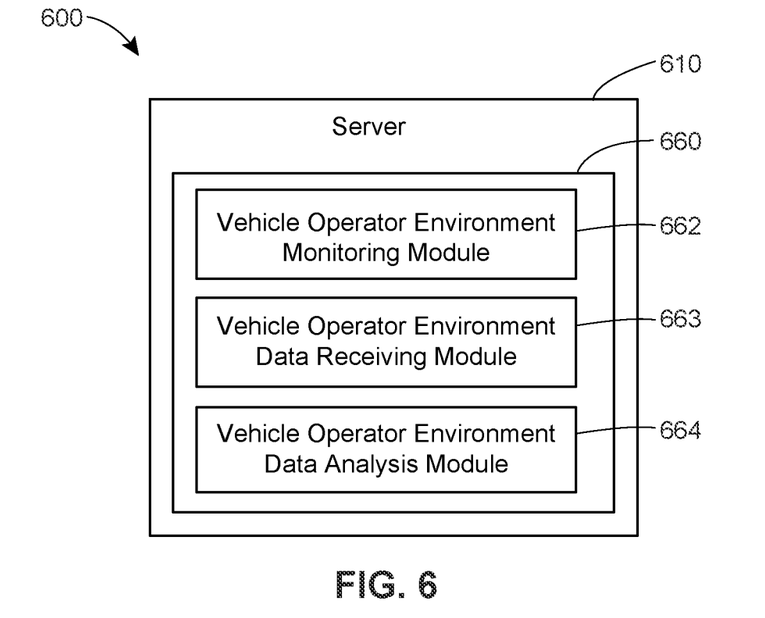
FIG. 6 illustrates a block diagram of an exemplary remote server for use in receiving, analyzing and storing vehicle operator related and environment data.
Figure 7:
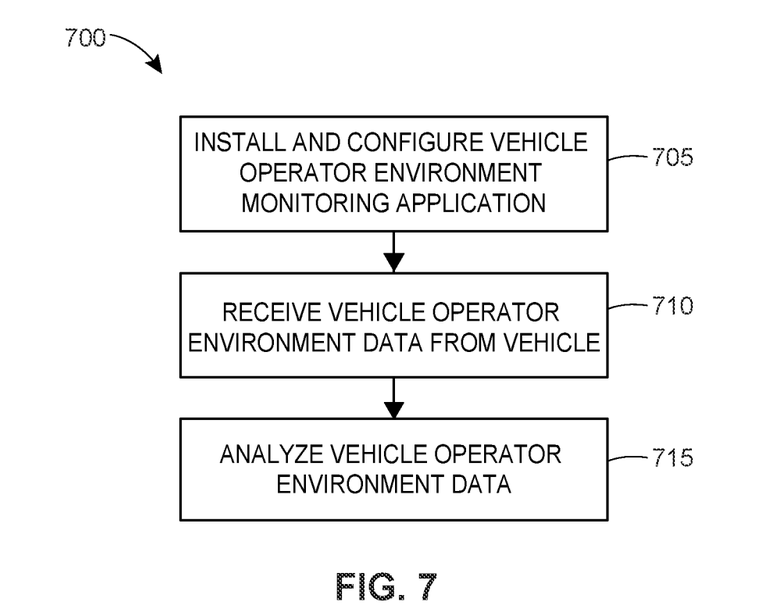
FIG. 7 depicts a flow diagram of an example method of receiving, analyzing and storing vehicle operator related and environment data.

Turning to FIGS. 6 and 7, a remote server 610 of an insurance risk related data collection system 600 is depicted along with a method of establishing an insurance risk related data file on the server 700. The remote server 610 may be similar to the remote server with insurance application 375 of FIG. 3. The method 700 may be implemented by executing the modules 662-664 on a processor (e.g., processor 385). In any event, the remote server 610 may include a vehicle operator environment monitoring module, a vehicle operator environment data receiving module 663 and a vehicle operator environment data analysis module 664 stored on a memory 660. The processor 385 may execute the vehicle operator environment monitoring module 662 to, for example, cause the processor 385 to receive data representative of vehicle operator data and/or vehicle operator environment data (block 705). The data representative of the vehicle operator data and/or the vehicle operator environment data may have been generated, for example, in conjunction with a vehicle safety study and may reflect an ideal position and orientation of a vehicle driver's head and hands. For example, the data representative of the vehicle operator and/or vehicle environment may indicate that the vehicle operator's left hand is grasping a steering wheel near a minus forty-five degree angle relative to a top of the steering wheel and the vehicle operator's right hand is grasping the steering wheel near a positive forty-five degree angle relative to the top of the steering wheel. Additionally, the data representative of the vehicle operator and/or vehicle operator environment may indicate that the vehicle operator's head is oriented such that the operator is looking forward out the front windshield of an associated vehicle. Alternatively, the data representative of the vehicle operator and/or vehicle operator environment may reflect a sequence of positions of the model vehicle operator. For example, a 3D model vehicle operator may reflect that the operator is periodically scanning the rearview mirrors while most often looking forward out the front windshield of an associated vehicle.

The processor 385 may execute the vehicle operator environment data receiving module 663 to retrieve vehicle operator data and/or vehicle operator environment data from a client device 310 and/or a vehicle module 305 (block 710). For example, the processor 385 may retrieve position data and, or sound data from a vehicle module 305 and/or data sourced from sensors within a client device 310 (e.g., internal accelerometer, GPS, gyroscope, compass, navigation systems and other sensors); data sourced from the vehicle (e.g., OBDII port, any internal or external computers, accelerometers, sensors, VIN, build sheets, radars, cameras, video, collision avoidance technologies, gross vehicle weight, weight distribution, rental or owned, active and passive safety features, safety ratings, and other vehicle data); data sourced from the driver (e.g., driver physiology indicators and sensors, driver control, driver behavior, driver distraction or attention, driver cognitive load, driver eye movement/condition, mental state of driver, driver reaction time, driver's vision across multiple environments, drivers medications, driver sensory limitations and expertise, and other driver data); data sourced from the environment (e.g., location, time of day, temperature, road surface conditions, noise levels inside vehicle cabin, traffic density, time of day, traffic density, dangerous intersections, curves and roads, Vehicle-to-Vehicle and Vehicle-to-Infrastructure information, electronic toll booths and other environmental data); and data sourced from the interactions of the vehicle (e.g., driver and driving environment: following and closing distance, driver control, driver response to safety warning systems, driver overriding of safety systems, crash and emergency notification systems, injury estimation systems, and other interactive response data). Alternatively, the processor 385 may retrieve data from the vehicle module that is representative of a 3D model of at least a portion of a vehicle driver.

The processor 385 may execute the vehicle operator environment data analysis module 664 to determine a position of at least a portion of a vehicle driver (block 715) based on the retrieved position data. For example, the processor 385 may generate a 3D model of at least a portion of a vehicle driver based on the data acquired from at least one position sensor 336, 337, 341, 342, 346, 347. The processor 385 may also generate an advisory based on a comparison of a 3D model of at least a portion of the vehicle driver and at least a portion of a 3D model vehicle operator. The advisory may be provided to the vehicle driver as a mechanism to inform the vehicle driver how he may improve his driving behavior. Furthermore, the processor 385 may determine a source and, or volume of sound within the vehicle interior based on data received from at least one microphone 351, 352. The processor 385 may also generate an advisory based on the data representative of the sound within the vehicle interior. The advisory may be provided to the vehicle driver as a mechanism to inform the vehicle driver how he may improve his driving behavior. The processor 385 may determine an insurance rate for a particular vehicle driver based, at least in part on position data received from at least one position sensor 336, 337, 341, 342, 346, 347 and, or sound data received from at least one microphone 351, 352. Alternatively, the processor 385 may determine an insurance rate for a particular vehicle driver based, at least in part on the comparison of a 3D model of at least a portion of the vehicle driver and at least a portion of a 3D model vehicle operator.

Figure 8:
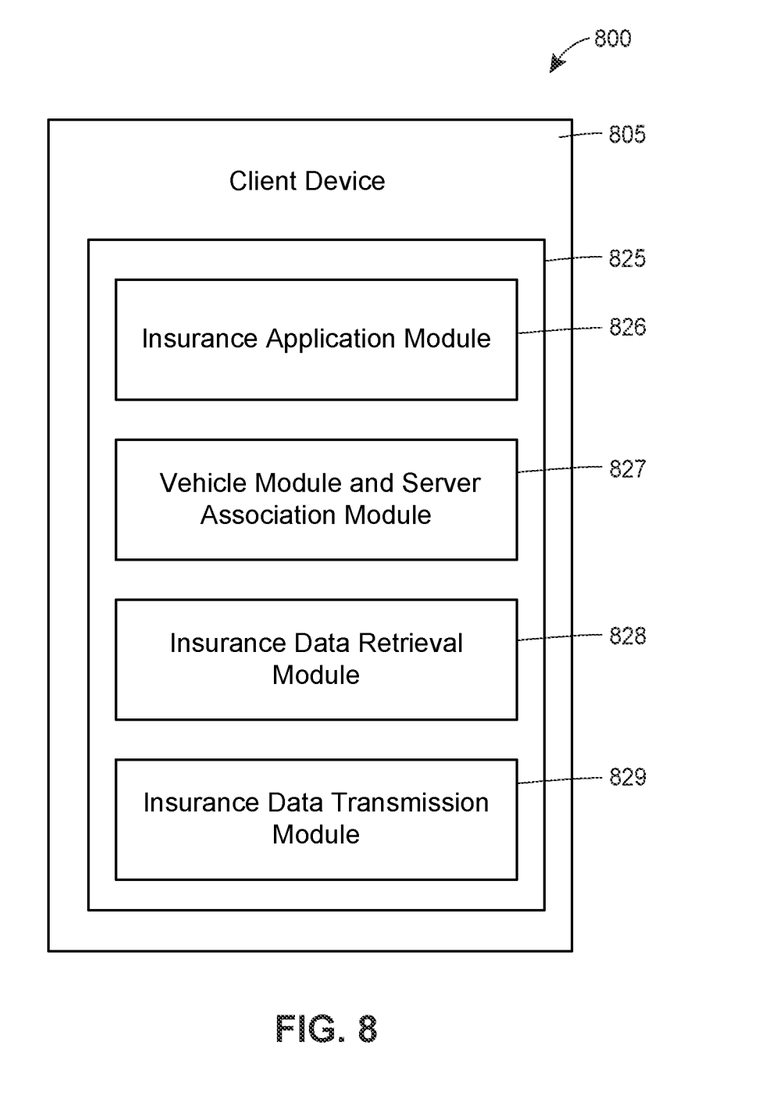
FIG. 8 depicts a block diagram of an exemplary client device for use in acquiring, analyzing, transmitting and displaying vehicle operator related and environment data.
Figure 9A:
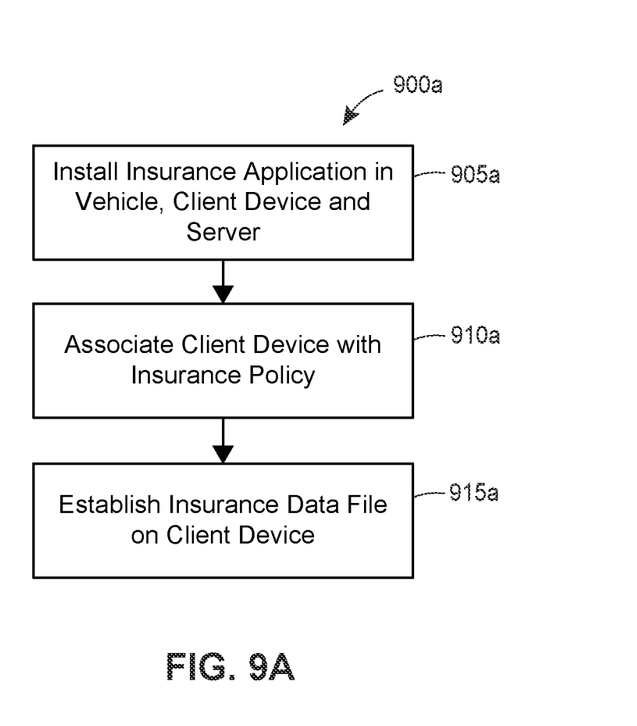
FIGS. 9A and 9B depict a flow diagrams of example methods of acquiring vehicle operator related and environment data on a client device.
Figure 9B:
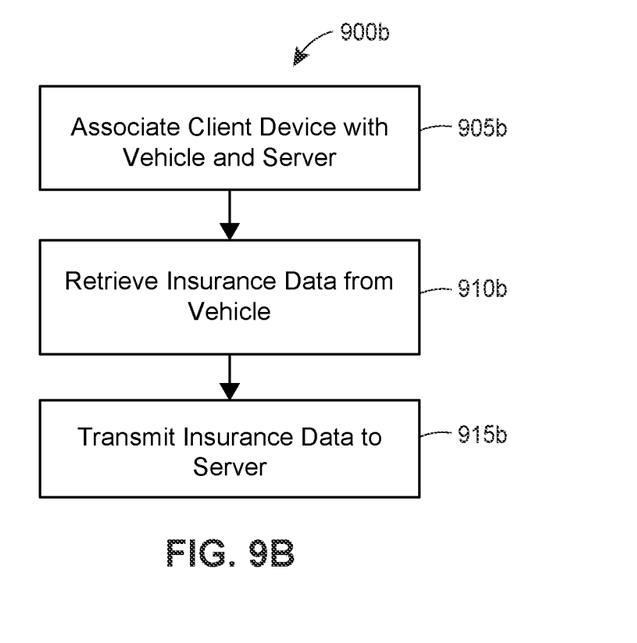

Turning to FIGS. 8, 9A and 9B, a client device 805 of an insurance risk related data collection system 800 is depicted along with a method of establishing an insurance risk related data file on the client device 900a and a method of transmitting insurance risk related data to a server 900b. The client device 905 may be similar to the client device with insurance application 310 of FIG. 3. The methods 900a, 900b may be implemented by executing the modules 826-829 on a processor (e.g., processor 363 of FIG. 3). In any event, the client device 805 may include an insurance application module 826, a vehicle module and server association module 827, an insurance data retrieval module 828 and an insurance data transmission module 829 stored in a memory 825. The processor 363 may execute the insurance application module 826 to, for example, cause the processor 363 to receive user inputs and associate the client device 805 with a vehicle module 305 (block 905a), associate the client device 805 with a remote server 375 (block 905a), associate the client device 805 with an insurance policy (block 910a) and to selectively determine the content of an insurance data file on the client device 805 (block 915a) based on the user inputs. Alternatively, the processor 363 may execute the vehicle module and server association module 828 to, for example, automatically associate the client device 805 with a vehicle module 305 (block 905a), with a remote server 375 (block 905a) and with an insurance policy (block 910a) and to automatically determine the content of vehicle operation data (block 915a). For example, the client device 805 may be pre-configured to automatically associate the client device 805 with a vehicle module 305 (block 905b), with a remote server 375 (block 905b) and with an insurance policy (block 910a) and to automatically determine the content of vehicle operation data when an insurance application 826 is stored in a client device memory 825 (block 905a).

The processor 363 may execute the insurance data retrieval module 828 to, for example, retrieve insurance risk related data from data sourced from sensors within a client device 310 (e.g., internal accelerometer, GPS, gyroscope, compass, navigation systems and other sensors); data sourced from the vehicle (e.g., OBDII port, any internal or external computers, accelerometers, sensors, VIN, build sheets, radars, cameras, video, collision avoidance technologies, gross vehicle weight, weight distribution, rental or owned, active and passive safety features, safety ratings, and other vehicle data); data sourced from the driver (e.g., driver physiology indicators and sensors, driver control, driver behavior, driver distraction or attention, driver cognitive load, driver eye movement/condition, mental state of driver, driver reaction time, driver's vision across multiple environments, drivers medications, driver sensory limitations and expertise, and other driver data); data sourced from the environment (e.g., location, time of day, temperature, road surface conditions, noise levels inside vehicle cabin, traffic density, time of day, traffic density, dangerous intersections, curves and roads, Vehicle-to-Vehicle and Vehicle-to-Infrastructure information, electronic toll booths and other environmental data); and data sourced from the interactions of the vehicle (e.g., driver and driving environment: following and closing distance, driver control, driver response to safety warning systems, driver overriding of safety systems, crash and emergency notification systems, injury estimation systems, and other interactive response data) and/or vehicle module 305 (block 910b). For example, the processor 363 may cause the client device 805 to retrieve insurance risk related data from a vehicle module 305 (block 910b) via a wireless cellular telephone network, a Bluetooth network, a WiFi network, etc.

The processor 363 may execute the insurance data transmission module 829 to, for example, transmit insurance risk related data to a remote server 375 (block 915b). For example, the processor 363 may cause the client device 805 to transmit insurance risk related data to a remote server 375 (block 915b) via a wireless cellular telephone network, a Bluetooth network, a WiFi network, etc. The processor 363 may collect raw data and send the data to an insurance company or third party computing device (e.g., computing device 375 of FIG. 3) for analysis and auto insurance risk assessment; collect raw data and use algorithms to summarize and assess auto insurance risk and then send a risk assessment to a remote computing device via a client device (e.g., a personal electronic device, such as a mobile telephone, a lap-top computer, a personal data assistant, a tablet computing device, etc.); collect raw data and use algorithms to summarize and assess auto insurance risk and provide feedback to insured driver on insurance cost, risk and ways to reduce insurance cost and risk via a client device (e.g., a personal electronic device, such as a mobile telephone, a lap-top computer, a personal data assistant, a tablet computing device, etc.); and presentation of data back to a driver such as feedback, results, costs and other information via a client device (e.g., a personal electronic device, such as a mobile telephone, a lap-top computer, a personal data assistant, a tablet computing device, etc.), web page or link.

The processor 363 may present feedback of driving data to a driver that may include, but is not limited to, providing feedback to drivers to quantify and help them improve their driving behavior, quantifying and helping drivers reduce their driving risk, and provide other information that would be helpful to reduce the risk of driving; providing services for insured drivers to manage their own risk and premium costs, assess insurance costs, pay insurance premiums, update insurance policies and coverage's in real-time, add new risk to insure and add new drivers to insure; providing services for insured drivers such as safest trip routing, trip planning, emergency crash notification, emergency roadside assistance, social networking opportunities, and other concierge services; and providing rating information to drivers based on the interpretation of data collected.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer implemented method, comprising:
receiving, at a processor of a computing device from a user of a client device via a user interface of the client device, a selection of what vehicle sensor data to collect, and a selection of what driver environment data to collect;
receiving, at the processor of the computing device, vehicle sensor data from at least one vehicle sensor, based on the selection, by the user via the user interface display of the client device, of what vehicle sensor data to collect, wherein the vehicle sensor data is representative of actual operation of a vehicle;
receiving, at the processor of the computing device, driver environment data from at least one sensor, wherein the driver environment data is representative of at least one of: a position of a driver-side seat or a position of a passenger-side seat;
determining, using the processor of the computing device, a real-time operating environment of the driver based on the received vehicle sensor data and the received driver environment data;
generating, using the processor of the computing device, at least one of: driver warning data or driver advisory data based on the determined real-time operating environment; and
transmitting, using the processor of the computing device, at least one of: the driver warning data or the driver advisory data, to the processor of the client device to be displayed to the driver via the user interface of the client device.

2. The method of claim 1, further comprising:
presenting, on a display of a computing device, an insurance risk display based on individual insurance risk data, wherein the insurance risk display is representative of an insurance risk of an individual.

3. The method of claim 2, further comprising:
receiving, at a processor of a computing device from the client device, driver input data, wherein the individual insurance risk data is further based on the driver input data.

4. The method of claim 1, further comprising:
receiving, at a processor of a computing device, driver input data, wherein the driver input data is representative of interaction of an individual with at least one of: a personal electronic device or the vehicle.

5. The method of claim 4, wherein the driver input data is representative of at least one of: driver physiology indicators and sensors, driver control, driver behavior, driver distraction or attention, driver cognitive load, driver eye movement/condition, mental state of a driver, driver reaction time, driver vision across multiple environments, driver medications, or driver sensory limitations and expertise.

6. The method of claim 4, wherein the driver input data is representative of at least one of: driver and driving environment, following and closing distance, driver control, driver response to safety warning systems, driver overriding of safety systems, crash and emergency notification systems, or injury estimation systems.

7. The method of claim 1, further comprising:
receiving, at the processor of the computing device, environment sensor data, wherein the environment sensor data is representative of an environment within which an individual is operating the vehicle.

8. The method of claim 7, wherein the individual insurance risk data is further based on the environment sensor data.

9. The method of claim 7, wherein the environment sensor data is representative of at least one of: vehicle location, time of day, temperature, road surface conditions, noise levels inside a vehicle cabin, traffic density, dangerous intersections, curves and roads, Vehicle-to-Vehicle and Vehicle-to-Infrastructure information, or electronic toll booths.

10. The method of claim 1, further comprising:
receiving, at a processor of a computing device from the client device, personal electronic device sensor data from at least one sensor of the client device including: an internal accelerometer sensor, a GPS sensor, a gyroscope sensor, a compass sensor, or a navigation system sensor.

11. The method of claim 1, wherein the vehicle sensor data is received from at least one of: an internal vehicle computer, an external vehicle computer, a vehicle accelerometer, a radar sensor, a camera, a video device, a collision avoidance system, an active vehicle safety system, or a passive vehicle safety system.

12. A computer system for determining a real-time operating environment of a vehicle driver, the system comprising:
at least one computing device having a processor and a memory storing computer-readable instructions that, when executed by the processor, cause the processor to:
receive vehicle sensor data from at least one vehicle sensor, based on a selection, by a user via a user interface display of a client device, of what vehicle sensor data to collect, wherein the vehicle sensor data is representative of actual operation of a vehicle;
receive driver environment data from at least one sensor, wherein the driver environment data is representative of at least one of: a position of a driver-side seat or a position of a passenger-side seat;
determine a real-time operating environment of the driver based on the received vehicle sensor data and the received driver environment data;
generate at least one of: driver warning data or driver advisory data based on the determined real-time operating environment; and
transmit at least one of: the driver warning data or the driver advisory data, to the processor of the client device to be displayed to the driver via the user interface of the client device.

13. The computer system of claim 12, wherein the instructions, when executed by the processor, further cause the processor to:
generate an insurance risk display based on individual insurance risk data, wherein the insurance risk display is representative of an insurance risk of an individual.

14. The computer system of claim 12, wherein the instructions, when executed by the processor, further cause the processor to:
receive driver input data, wherein the driver input data is representative of interaction of an individual with at least one of: a personal electronic device or the vehicle.

15. The computer system of claim 12, wherein the instructions, when executed by the processor, further cause the processor to receive environment sensor data, wherein the environment sensor data is representative of an environment within which an individual is operating the vehicle.

16. A non-transitory, computer-readable medium storing instructions that, when executed by a processor of a computer system, cause the processor to:
receive vehicle sensor data from at least one vehicle sensor, based on the selection, by a user via a user interface display of a client device, of what vehicle sensor data to collect, wherein the vehicle sensor data is representative of actual operation of the vehicle;
receive driver environment data from at least one sensor, wherein the driver environment data is representative of at least one of: a position of a driver-side seat or a position of a passenger-side seat;
determine a real-time operating environment of the driver based on the received vehicle sensor data and the received driver environment data;
generate at least one of: driver warning data or driver advisory data based on the determined real-time operating environment; and
transmit at least one of: the driver warning data or the driver advisory data, to the processor of the client device, to be displayed to the driver via the user interface of the client device.

17. The computer-readable medium of claim 16, wherein the instructions, when executed by the processor, further cause the processor to:
generate an insurance risk display based on individual insurance risk data, wherein the insurance risk display is representative of an insurance risk of an individual.

18. The computer-readable medium of claim 16, wherein the instructions, when executed by the processor, further cause the processor to:
receive driver input data, wherein the driver input data is representative of interaction of an individual with at least one of: a personal electronic device or the vehicle.

19. The computer-readable medium of claim 18, wherein the instructions, when executed by the processor, further cause the processor to:
receive driver input data, wherein the driver input data is representative of at least one of: driver physiology indicators and sensors, driver control, driver behavior, driver distraction or attention, driver cognitive load, driver eye movement/condition, mental state of a driver, driver reaction time, driver vision across multiple environments, driver medications, or driver sensory limitations and expertise.

20. The computer-readable medium of claim 16, wherein the instructions, when executed by the processor, further cause the processor to receive environment sensor data, wherein the environment sensor data is representative of an environment within which an individual is operating the vehicle.

* * * * *